United States Patent
Truong (10) Patent No.: US 11,263,614 B2
(45) Date of Patent: Mar. 1, 2022

(54) DETERMINING CASH DRAWER ACCESS

(71) Applicant: HEWLETT-PACKARD DEVELOPMENT COMPANY, L.P., Houston, TX (US)

(72) Inventor: Binh T. Truong, Houston, TX (US)

(*) Notice: Subject to any disclaimer, the term of this patent is extended or adjusted under 35 U.S.C. 154(b) by 190 days.

(21) Appl. No.: 16/076,756

(22) PCT Filed: Feb. 7, 2017

(86) PCT No.: PCT/US2017/016800
§ 371 (c)(1),
(2) Date: Aug. 9, 2018

(87) PCT Pub. No.: WO2018/147827
PCT Pub. Date: Aug. 16, 2018

(65) Prior Publication Data
US 2021/0182824 A1 Jun. 17, 2021

(51) Int. Cl.
*G06Q 20/20* (2012.01)
*G06F 16/25* (2019.01)
*G06F 9/445* (2018.01)
*G07G 1/00* (2006.01)

(52) U.S. Cl.
CPC ....... *G06Q 20/206* (2013.01); *G06F 9/44521* (2013.01); *G06F 16/25* (2019.01); *G07G 1/0009* (2013.01)

(58) Field of Classification Search
CPC ... G06Q 20/206; G06F 16/25; G06F 9/44521; G07G 1/0009
See application file for complete search history.

(56) References Cited

U.S. PATENT DOCUMENTS

| 6,857,505 B1* | 2/2005 | Mason ............... A47F 9/046 186/59 |
| 10,909,590 B2* | 2/2021 | Brock ............... G06Q 30/0282 |
| 2002/0033413 A1* | 3/2002 | Murakami .......... G07G 1/0027 235/10 |
| 2003/0120546 A1 | 6/2003 | Cusack et al. |

(Continued)

FOREIGN PATENT DOCUMENTS

| CN | 101615319 | 12/2009 |
| GB | 2497368 | 6/2013 |

(Continued)

OTHER PUBLICATIONS

"Limiting who Can Open the Cash Drawer". Retrieved from <https://www.touchbistro.com/help/articles/limiting-who-can-open-the-cash-drawer/> on Apr. 7, 2021. Originally published 2016. (Year: 2016).*

(Continued)

*Primary Examiner* — Nathan A Mitchell
(74) *Attorney, Agent, or Firm* — Brooks Cameron & Huebsch PLLC (57) ABSTRACT

Example implementations relate to determining cash drawer access. An example controller can detect a request to access an integrated cash drawer, determine a source of the request, and filter the request based on the determined source. In some examples, in response to a rejection during filtering, access to the integrated cash drawer can be denied and in response to an allowance during filtering access to the integrated cash drawer can be allowed.

15 Claims, 5 Drawing Sheets

(56) References Cited

U.S. PATENT DOCUMENTS

| | | | |
|---|---|---|---|
| 2004/0135801 A1* | 7/2004 | Thompson | G06Q 30/018 715/702 |
| 2011/0172960 A1 | 7/2011 | St. George et al. | |
| 2012/0166380 A1* | 6/2012 | Sridharan | G06Q 30/02 706/52 |
| 2012/0233006 A1* | 9/2012 | St. George | G07G 1/009 705/18 |
| 2013/0166400 A1 | 6/2013 | Nguyen et al. | |
| 2013/0346027 A1* | 12/2013 | St. George | G07G 1/0018 702/187 |
| 2014/0052552 A1* | 2/2014 | Truong | G07G 1/0009 705/18 |
| 2014/0088760 A1* | 3/2014 | Truong | G07G 1/0009 700/244 |
| 2014/0379501 A1* | 12/2014 | Jungclaus | G06Q 20/206 705/18 |
| 2017/0364887 A1* | 12/2017 | Dullings | G07G 1/14 |

FOREIGN PATENT DOCUMENTS

| | | |
|---|---|---|
| JP | 3262097 | 3/2002 |
| JP | 2011242990 A * | 12/2011 |

OTHER PUBLICATIONS

Cash Drawer Management. Retrieved from <https://squareup.com/help/us/en/article/5152-cash-drawer-management> on Apr. 7, 2021. Originally published 2014. (Year: 2014).*

Radiant Model P1520 POS Terminal, Dec. 12, 2006, < https://www.ecpcomputers.com/EBAY/hw-ref-P1520UserGuide.pdf >.

\* cited by examiner

DETERMINING CASH DRAWER ACCESS

BACKGROUND

Cash drawers include separate compartments for coins and bills of different denominations. A cash drawer may be in communication with a cash register. A cash drawer may be opened by an instruction from the cash register or manually, for instance, using a key.

DETAILED DESCRIPTION

Integrated cash drawers can be used with a plurality of computing devices. For instance, an integrated cash drawer can include a cash drawer that works with other subsystems (e.g., a computing device cash register) to function as a system. A cash drawer, a point-of-service (POS) device, computing devices, applications, and/or other subsystems can be brought together physically or functionally to act as a coordinated system.

Cash drawer security can be a concern for retailers and other users of integrated cash drawers. For instance, a retailer may want to monitor the integrated cash drawer to determine when and how the integrated cash drawer was accessed. For example, if a sum of money is missing from an integrated cash drawer, this information may be helpful in determining what happened to the missing sum of money.

Some approaches to cash drawer security include using a universal serial bus (USB) cash drawer with built-in firmware that can store a usage count for the cash drawer. For instance, cash drawer event information may be stored in the firmware. In contrast, examples of the present disclosure can store integrated cash drawer information in a service driver physically located in an operating system. This can allow for storage of more complex data and a greater amount of data (e.g., because of the use of hard drive space) as compared to firmware storage, which can be limited and may not allow for as much data storage as examples of the present disclosure. In addition, examples of the present disclosure can include the use of a registered jack 12 (RJ12) integrated cash drawer, which can be less expensive as compared to USB cash drawers.

Other approaches use third party applications to monitor certain specific calls (e.g., only object linking and embedding (OLE) for retail point-of service (OPOS) or only Java point-of-service (JPOS)), but do not monitor general purpose input/output (GPIO) calls. In contrast, examples of the present disclosure can monitor a plurality of calls (e.g., OPOS, JPOS, and GPIO, among others), and can determine whether an integrated cash drawer has been manually opened or triggered by an application.

Some other approaches allow for cash drawers to be accessed by different applications, exposing the cash drawer to a security risk. In contrast, examples of the present disclosure can determine which application has been used to attempt to access the integrated cash drawer and can filter out particular applications. For instance, examples of the presented disclosure can allow certain applications to access the integrated cash drawer while rejecting others.

Figure 1:
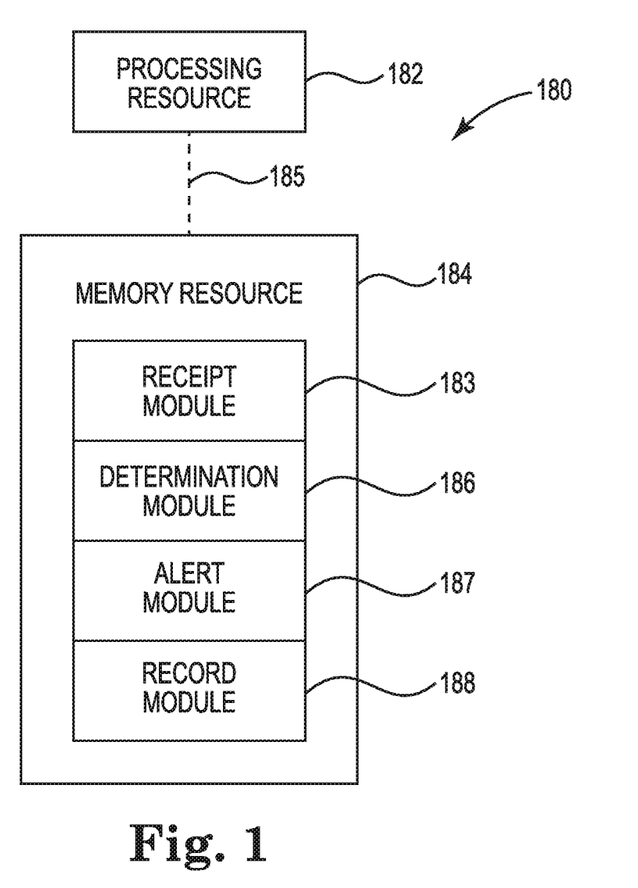
FIG. 1 illustrates a diagram of a computing system including a processing resource, a memory resource, and a number of modules according to an example.

FIG. 1 illustrates a diagram of a computing system 180 including a processing resource 182, a memory resource 184, and a number of modules 183, 186, 188 according to an example. The computing system 180 can utilize instructions (e.g., software and/or firmware) hardware, and/or logic to perform a number of functions including those described herein. The computing system 180 can be a combination of hardware and program instructions configured to share information. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 382 can be implemented in a single device or distributed across multiple devices. The program instructions (e.g., machine-readable instructions (MRI)) can include instructions stored on the memory resource 184 and executable by the processing resource 182 to implement a desired function (e.g., determining cash drawer access).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 183, 186, 187, 188 can include MRI that when executed by the processing resource 182 can perform a number of functions including those described herein. The number of modules 183, 186, 187, 188 can be sub-modules of other modules. For example, the determination module 186 and the record module 188 can be sub-modules and/or contained within the same computing system. In another example, the number of modules 183, 186, 187, 188 can comprise individual modules at separate and distinct locations (e.g., MRM, etc.).

Each of the number of modules 183, 186, 187, 188 can include instructions that when executed by the processing resource 182 can function as a corresponding engine. For example, the receipt module 183 can include instructions that when executed by the processing resource 182 can function as a receipt engine. Similar, each of the number of modules 186, 187, 188 can include instructions that when executed by the processing resource 182 can function as engines.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 183, 186, 187, 188 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

In an example, receipt module 183 can include instructions that when executed by the processing resource 182 can cause a computing system to receive a request to access an RJ12 integrated cash drawer. In some examples, the RJ12 integrated cash drawer may not have built-in firmware. In some instances, the integrated cash drawer may be a USB cash drawer. A request to access the integrated cash drawer can include, for instance, a user trying to access the integrated cash drawer, either for approved or unapproved reasons. A user may be performing an approved cash transaction for a customer, for instance, or alternatively, a user may be trying to break into the integrated cash drawer.

Determination module 186 can include instructions that when executed by the processing resource 182 can cause a computing system to determine a source of the request. For instance, it can be determined whether the access was requested via an application using OPOS design, an application using JPOS design, an application using a non-unified point-of-service (UPOS) design (e.g., a direct GPIO call), and/or manually (e.g., break-in, keyed entry, etc.). Other application designs (e.g., other retail programming languages) can be determined to be a source, as well. In some examples, it can be determined that the source is a manual source in response to a lack of detection of an application source and/or a retail programming language as the source.

Alert module 187 can include instructions that when executed by the processing resource 182 can cause a computing system to provide an alert of the request based on a predefined access rule. For instance, predefined access rule can include particular sources that trigger alerts. For example, an alert may be triggered each time it is determined the integrated cash drawer is accessed manually. In some examples, particular application path access requests may be desired, and in response, any access request other than the desired requests may trigger alerts, Alerts may be provided, for instance, to a system manager, a retail manager, a particular device, an email address, and/or other party.

Record module 188 can include instructions that when executed by the processing resource 182 can cause a computing system to record the source to a database local to the computing system. In some instances the database can be the same as or similar to databases discussed with reference to FIGS. 1 and 2. For instance, information about the source can be recorded to a secure device driver physically located on an operating system (OS) and/or on a disk.

In some examples, computing system 180 can include a filter module (not illustrated in FIG. 1) that can include instructions that when executed by the processing resource 182 can cause a computing system to reject access to the RJ12 integrated cash drawer in response to the determining the source is an unapproved retail programming language source. Filter module can include instructions that when executed by the processing resource 182 can cause a computing system to approve access to the RJ12 integrated cash drawer in response to the determining the source is approved source.

Figure 2:
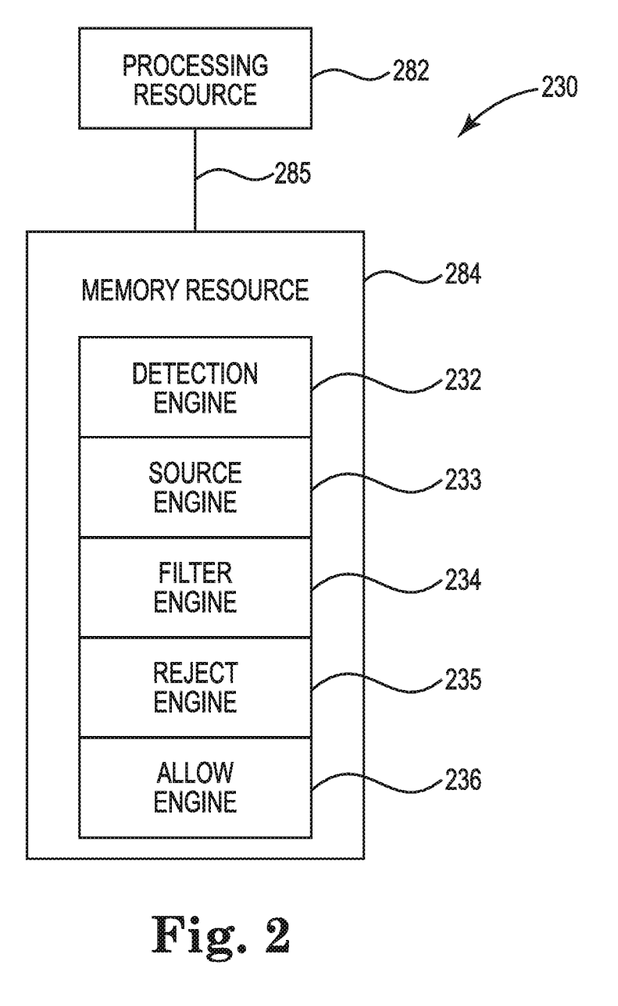
FIG. 2 illustrates a diagram of a controller including a processing resource, a memory resource, and a number of modules according to an example.

FIG. 2 illustrates a diagram of an example controller 230 including a processing resource 282, a memory resource 284, and a number of engines 232, 233, 234, 235, 236 according to an example. For example, the controller 230 can be a combination of hardware and instructions for determining cash drawer access. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., determining cash drawer access).

The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes a number of engines (e.g., detection engine 232, source engine 433, filter engine 234, reject engine 235, allow engine 236, etc.). The memory resource 284 can include additional or fewer engines than illustrated to perform the various functions described herein.

The number of engines can include a combination of hardware and instructions to perform a number of functions described herein (e.g., determining cash drawer access). The instructions (e.g., software, firmware, etc.) can be downloaded and stored in a memory resource (e.g., MRM) as well as a hard-wired program (e.g., logic), among other possibilities.

The detection engine 232 can detect a request to access an integrated cash drawer, A request to access the integrated cash drawer can include, for instance, a user trying to access the integrated cash drawer, either for approved or unapproved reasons. Detection can include, for instance, detecting an application attempting to access the integrated cash drawer and/or detecting a manual access attempt.

The source engine 233 can determine a source of the request. In some examples, the source can be an application used to access the integrated cash drawer. For instance, the source can include an OPOS application, a JPOS application, and/or a GPIO application, among others. For instance, core, service, and control drivers of an integrated cash drawer port (e.g., an RJ12 port) can be leveraged, along with a service driver, to connect to each of the integrated cash drawer's driver states. By doing so, each driver state can be monitored, allowing for a determination of how the integrated cash drawer is accessed.

In some instances, a manual source can be determined based on a lack of a determination of an application accessing the cash drawer. For instance, if no application access attempt is determined by the source engine 233, the source engine 233 can determine that the integrated cash drawer has been access manual (e.g., break-in, key access, etc.).

The filter engine 234 can filter the request based on the determined source. For instance, particular sources attempting to access the integrated cash drawer can be filter, either to allow or reject access to the cash drawer. For instance, a retailer may use a particular source to access their integrated cash drawer for customer cash transactions. An access request of this type may be filtered as an approved or allowable access request. In contrast, an access request of a different type may be filtered as an unapproved or rejected access request. The filtering can allow for a reduction in security breaches by others without approval to access the integrated cash drawer (e.g., hackers). The reject engine 235 can deny access to the integrated cash drawer in response to a rejection during filtering, and the allow engine 236 can allow access to the integrated cash drawer in response to an allowance during filtering.

Figure 3:
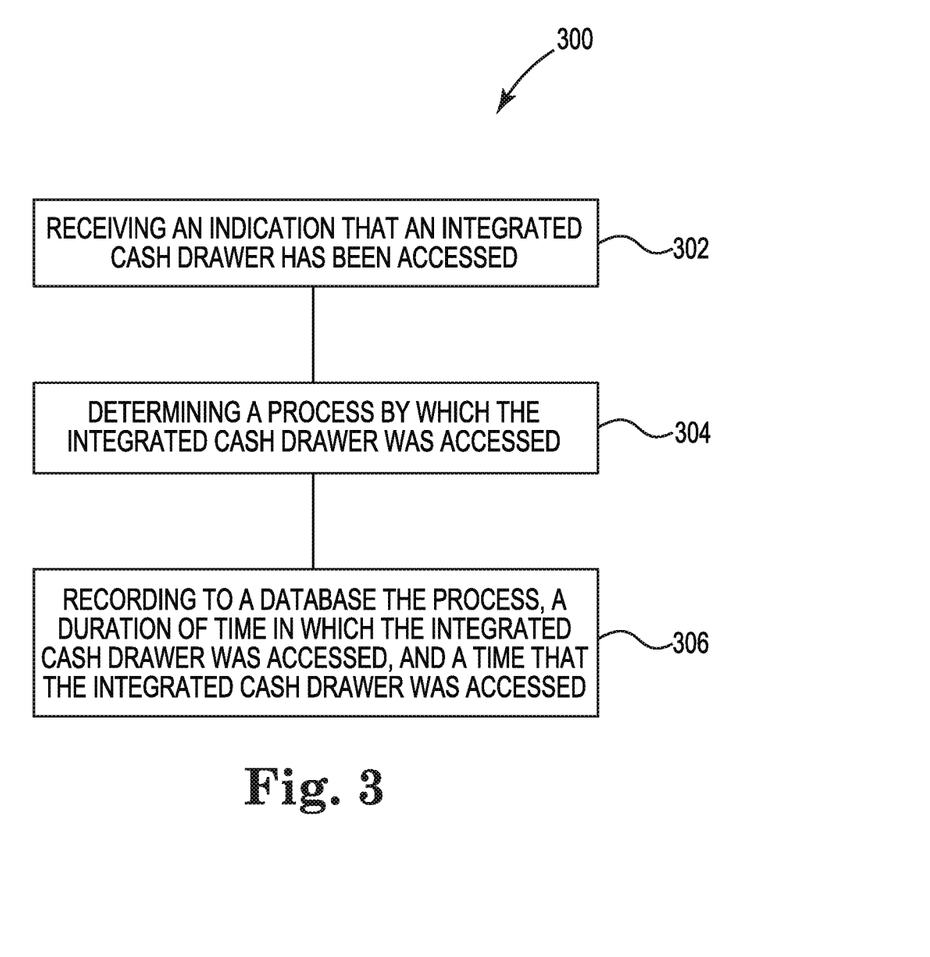
FIG. 3 illustrates a diagram of a method for determining cash drawer access according to an example

In some examples, the controller 230 can include a storage engine (not illustrated in FIG. 2) to store to a database the request to access the integrated cash drawer. For instance, the request, along with a history of other requests can be stored to the database. This information can be used to determine patterns of access, or to review in case of an unauthorized access, among other uses. The database can, in some instances, be used for storage of times, dates, access counts, and durations of accesses, as will be discussed further herein, FIG. 3 illustrates a diagram of a method 300 for determining cash drawer access according to an example. At 302, method 300 can include receiving an indication that an integrated cash drawer has been accessed. For instance, an indication can include an indication that a particular application has been used to access the integrated cash drawer or that the integrated cash drawer has been accessed manually. The indication can be in the form of an alert or may be logged into a database, among other indications. At 304, method 300 can include determining a process by which the integrated cash drawer was accessed. For example, it can be determined the integrated cash drawer was accessed by a retail programming language, application, or that the cash drawer was accessed manually, among others.

Method 300, at 306 can include recording to a database the process, a duration of time in which the integrated cash drawer was accessed, and a time that the integrated cash drawer was accessed. The time, in some instances, can include a time of day and/or a date. In some examples, an access count of how many times the integrated cash drawer was accessed may also be recorded to the database. A history of the recorded information, as well as prior recorded information can be stored in the database.

In some examples, alerts may be sent regarding a status of the cash drawer. For instance, an alert can be sent in response to the duration of time in which the integrated cash drawer was accessed exceeding a particular threshold, and/or based on the determined process by which the integrated cash drawer was accessed. An application program interface (API) can be provided for point-of-service applications and/or third party manageability applications to connect to and read the database. In some examples, alerts can be provided via the point-of-service and/or manageability applications, and the alerts can include information associated with the accessing of the integrated cash drawer. For instance, an alert may be sent if access to the integrated cash drawer is attempted from a non-retail (e.g., non-UPOS) application, which may indicate unauthorized access attempts.

In some examples, method 300 is performed in real time. For instance, as an integrated cash drawer is accessed, determinations can be made with respect to how the integrated cash drawer is being accessed, and filtering can occur. This can allow for allowance or rejection of access to the integrated cash drawer in real time.

Figure 4:
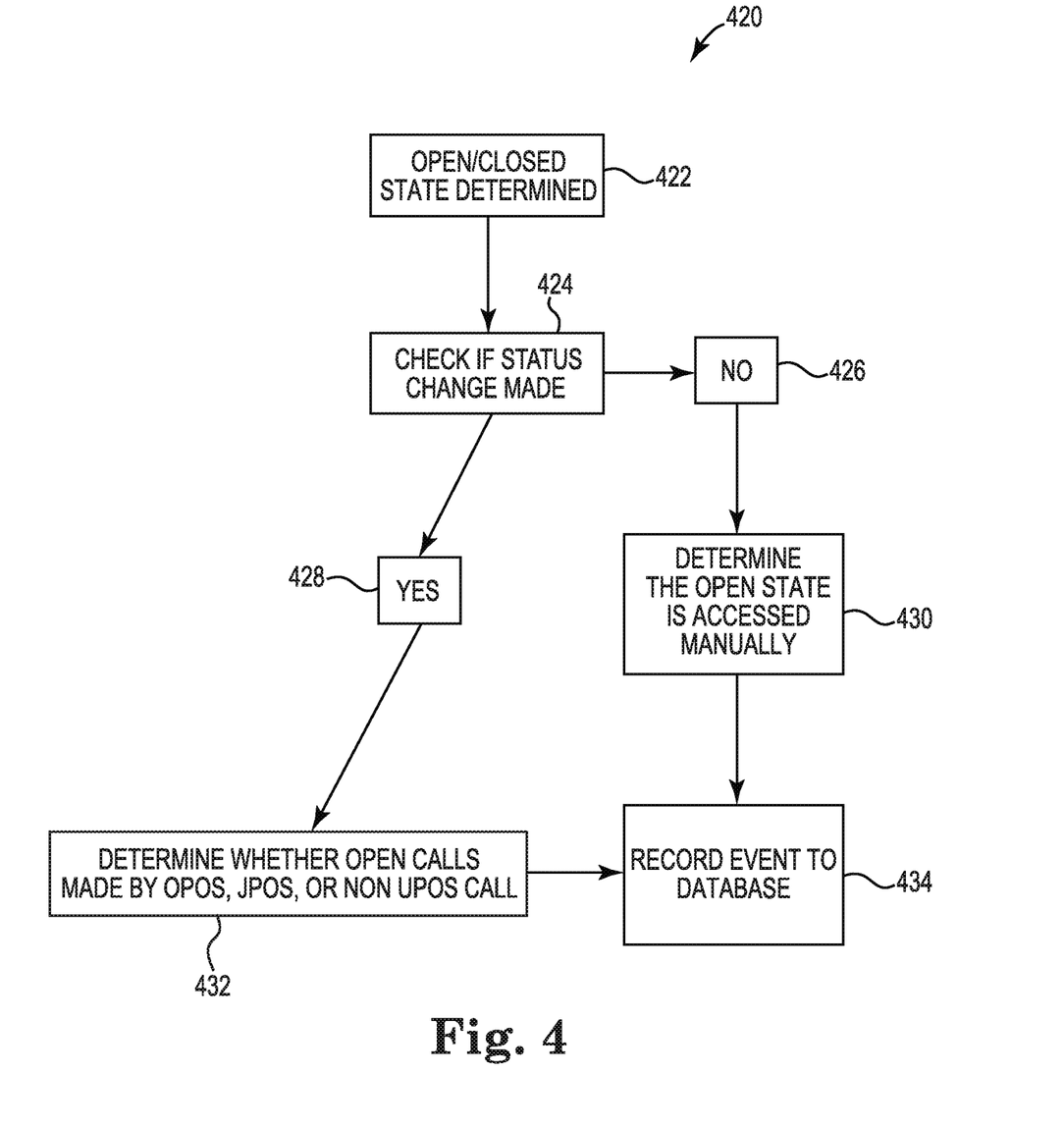
FIG. 4 illustrates a diagram of another method for determining cash drawer access according to an example.

FIG. 4 illustrates a diagram of another method 420 for determining cash drawer access according to an example. At 422, a determination is made about an open or closed state of an integrated cash drawer. For instance, a determination can be made using a GPIO bit as to whether or not an integrated cash drawer has been accessed, A status bit may provide an "open" or "closed" state of the integrated cash drawer. An open state means the cash drawer has been accessed and can be referred to as an "event".

At 424, a status change check is made. For instance, a core driver can be used to determine if an application has been used to access the open cash drawer. In some examples, the core driver can communicate with a basic input/output system to make this determination. If, at 426, it is determined that a status change is not made, it can be determined that the integrated cash drawer was accessed manually. Put another way, the open state was manual, for instance by a key or by forcibly opening the integrated cash drawer. If, at 428, it is determined that a status change is made, it can be determined whether open calls were made by an ©POS, a JPOS, or a non-UPOS call. For example, a determination of the source of the access to the integrated cash drawer can be determined.

At 434, the event can be recorded to a database, for instance via a registry, namespace within a Windows Management Instrumentation (WMI) table, or file base, among other recording manners. The event itself can be recorded, along with the number of times accessed, when it was accessed, a duration of time it was accessed, etc. An alert can be sent based on information about the event, including for instance, if the integrated cash drawer was accessed more than a threshold duration, or if an unapproved source was used to access the integrated cash drawer. Rules may be set to determine when an alert is sent.

Figure 5:
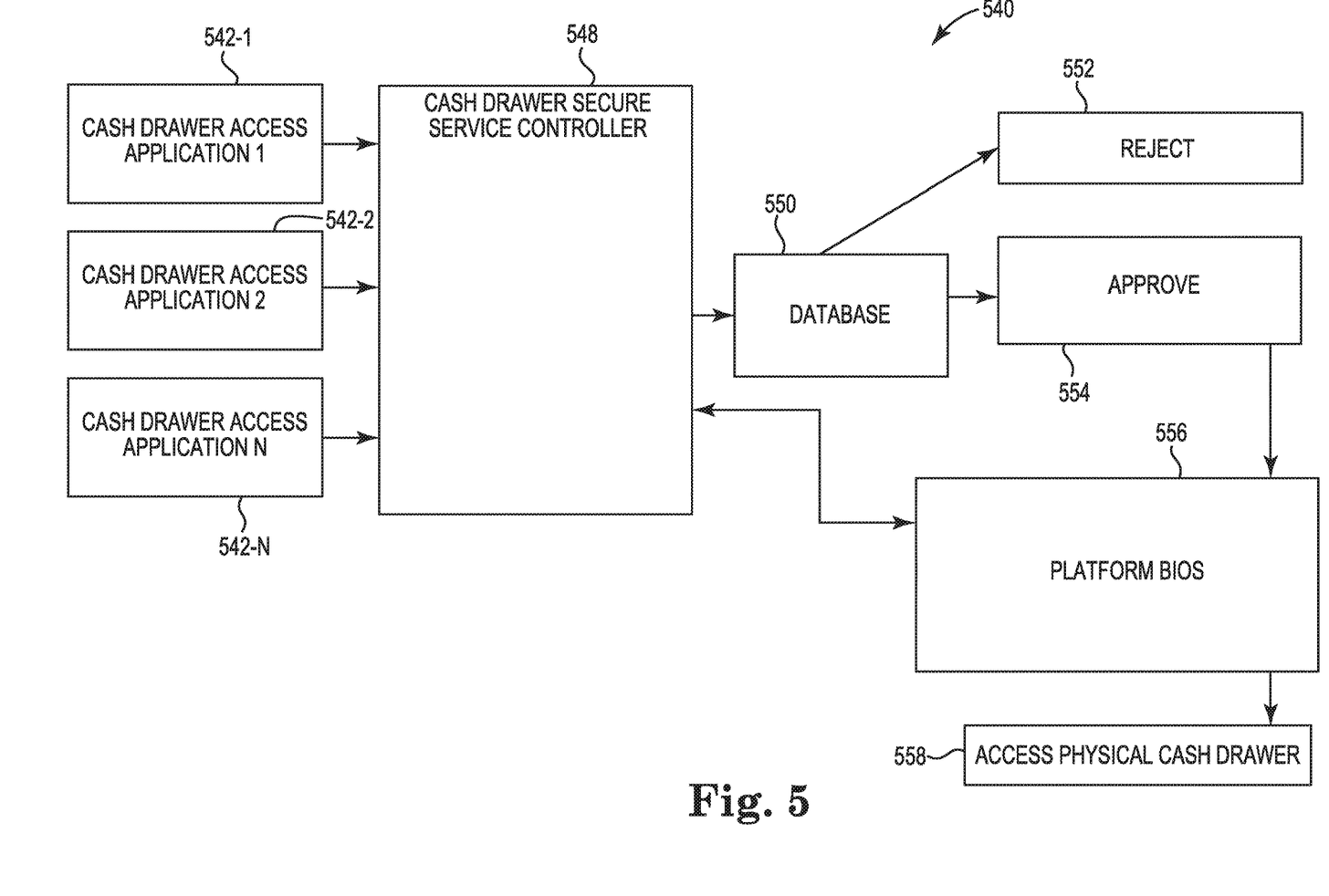
FIG. 5 illustrates a diagram of a system including a controller according to an example.

FIG. 5 illustrates a diagram of a system 540 including a controller 548 according to an example. In some examples, controller 548 can be the same or a similar controller 230 as discussed in FIG. 2 and can be associated with an integrated cash drawer, including an RJ12 integrated cash drawer. Controller 548 can be an integrated cash drawer secure service controller, and can receive access requests from a plurality of applications 542-1, 542-2, . . . , 542-n. These requests can be made via programming languages and or application calls such as OPOS calls, JPOS calls, or non UPOS calls, among others.

Controller 548 can determine which applications can access the integrated cash drawer, and can log access attempts to database 550. Controller 548 can, in some instances, monitor a BIOS for manual access and/or physical tampering. Database 550 can be local, and can store information associated with access to the integrated cash drawer including a source of access, a time and date of access, a duration of access, and an access count of how many times the integrated cash drawer was accessed. This information can be used to filter access requests to a reject database 552 or an approve database 554. For instance, a controller may determine only JPOS applications can be used to access the automated cash drawer. In such an example, access and/or access attempts made via JPOS applications are approved and moved to approve database 552, while all other access attempts are moved to reject database 554.

If it is determined that no application call was made to access the integrated cash drawer, a determination can be made at a device firmware layer and/or platform BIOS layer 556 that the integrated cash drawer was accessed manually, for instance by a key or forcibly. The integrated cash drawer can be physically accessed via an access physical cash drawer layer 558, either manually or via an approved application.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense,

What is claimed:

1. A non-transitory machine-readable medium storing instructions executable by a processing resource to cause a computing system to:
  store integrated cash drawer information in a driver physically located in an operating system of the computing system;
  detect a request to access the integrated cash drawer including general input/output calls;
  determine a source of the request;
  record information about the source and a history of requests to the driver;
  determine patterns of access to the integrated cash drawer based on the stored information, the recorded source information, and the history of requests;
  filter the request based on the determined source and the determined patterns;
  in response to a rejection during filtering, deny access to the integrated cash drawer; and
  in response to an allowance during filtering, allow access to the integrated cash drawer.

2. The controller of claim 1, wherein the source is an application used to access the integrated cash drawer.

3. The controller of claim 1, wherein the source is at least one of an object linking and embedding for retail point of service (OPOS) application, a Java point-of-service (JPOS) application, and a direct input/output (I/O) application.

4. The controller of claim 1, further comprising instructions executable to store to a database the request to access the integrated cash drawer.

5. A method for determining cash drawer access, comprising:
  storing integrated cash drawer information in a driver physically located in are operating system of a computing system;
  receiving an indication that an integrated cash drawer has been accessed including general input/output calls;
  determining a process by which the integrated cash drawer was accessed; and
  recording to the driver the process, a source of the access, a history of requests to the driver, a duration of time in which the integrated cash drawer was accessed, and a time that the integrated cash drawer was accessed;
  determining patterns of access to the integrated cash drawer based on data recorded to the database;
  filtering the request based on the determined source and the determined patterns;
  in response to a rejection during filtering, denying access to the integrated cash drawer; and
  in response to an allowance during filtering, allowing access to the integrated cash drawer.

6. The method of claim 5, wherein determining the process comprises determining the integrated cash drawer was accessed at least by one of a retail programming language and manually.

7. The method of claim 5, wherein the method is performed in real time.

8. The method of claim 5, further comprising sending an alert in response to the duration of time in which the integrated cash drawer was accessed exceeding a particular threshold.

9. The method of claim 5, further comprising sending an alert based on the determined process by which the integrated cash drawer was accessed.

10. The method of claim 5, wherein recording the process, the duration of time, and the time to the driver comprises recording the process, the duration of time, and the time to a secure device driver.

11. A non-transitory machine-readable medium storing instructions executable by a processing resource to cause a computing system to:
  store registered jack (RJ) 12 integrated cash drawer information in a driver physically located an operating system of the computing system;
  receive a request to access the RJ12 integrated cash drawer;
  determine a source of the request;
  provide an alert of the request based on a predefined access rule;
  record the source to a database local to the computing system
  record information about the source and a history of requests to the driver;
  determine patterns of access to the RJ12 integrated cash drawer based on the stored information, the recorded source information and the history of requests;
  filter the request based on the determined source and the determined patterns;
  in response to a rejection during filtering, deny access to the RJ12 integrated cash drawer; and in response to an allowance during filtering, allow access to the RJ12 integrated cash drawer.

12. The medium of claim 11, further comprising instructions executable to reject access to the RJ12 integrated cash drawer in response to the determining the source is an unapproved retail programming language source.

13. The medium of claim 11, further comprising instructions executable to approve access to the RJ12 integrated cash drawer in response to the determining the source is approved source.

14. The medium of claim 11, wherein the instructions to determine the source are further executable to determine the source is a manual source in response to a lack of detection of a retail programming language as the source.

15. The medium of claim 11, further comprising recording an access count to the database.

* * * * *